Dec. 26, 1939.   P. I. SCHULTZ ET AL   2,184,363
HOUSING FOR FLEXIBLE MEMBERS
Filed Dec. 23, 1937   2 Sheets-Sheet 1

INVENTORS
Paul I. Schultz &
James J. Pelouch
by Woodling and Krost
ATTORNEYS

INVENTORS
Paul I. Schultz &
James J. Pelouch
ATTORNEY.

Patented Dec. 26, 1939

2,184,363

UNITED STATES PATENT OFFICE 2,184,363

HOUSING FOR FLEXIBLE MEMBERS

Paul I. Schultz and James J. Pelouch, Cleveland, Ohio, assignors to The United States Air Compressor Company Application December 23, 1937, Serial No. 181,453

3 Claims. (Cl. 299—77)

Our invention relates generally to housings for flexible conduits, hoses, cords, cables, and the like, and to a method for looping the said hoses, conduits, cords, cables, and the like.

An object of our invention is to provide a device for readily storing a flexible member such as a hose or electric cord within a confined space.

Another object is to provide an external reel for looping a flexible member without rotating or moving parts.

Another object is to provide a device for constraining a flexible member into alternate loops.

Another object is to provide a device for forming a flexible member into the shape of a figure 8.

A further object is to provide a housing for a flexible member to permit ready and easy withdrawal from, and insertion into, the housing.

A still further object is to provide a device for looping an elongated flexible member without the aid of an internal reel and without moving parts.

And a still further object is to provide a method of looping a flexible member, and more particularly a method for looping a flexible member into alternate loops.

Other objects and a fuller understanding of our invention may be had by referring to the following description and claims, taken in combination with the accompanying drawings, in which:

Figure 1:
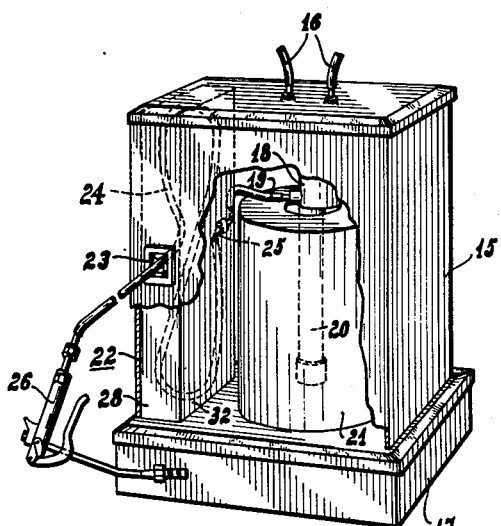
Figure 1 is a perspective view of a grease dispensing compartment having a grease hose, incorporating our device, a portion of the compartment being cut away to illustrate the mounting of the housing within the compartment.

Elongated flexible members such as hoses are often used as conduits for conducting fluid under pressure from a pump or other similar device to a distant point for dispensation of the fluid. One common apparatus utilizing such a flexible hose is a grease dispenser wherein grease or similar fluid is removed from a container by a pump mechanism and delivered under pressure to parts to be lubricated through a hose of rubber or other material which permits bending and ready extension for use in greasing with, the grease dispenser. In Figure 1, there is illustrated a grease dispenser unit having a compartment 15 supported upon a base 17 in such a manner that the compartment 15 may be raised and lowered over the grease can 21 resting on the base 17 within the compartment 15, as shown and described in our pending applications filed on February 1, 1936, and April 22, 1937, now Patents 2,105,990 and 2,105,991 respectively, for Dispensing devices. Or the compartment 15 may have side wall means through which the grease can 21 may be inserted under the pump assembly 18 as shown and described in our above mentioned patent applications. Air conduits 16 connected to a source of compressed air lead through openings in the top of the compartment 15 for operating the pump assembly 18 having the downwardly extending portion 20 which draws grease or lubricant from the can 21 and forces it out through the outlet conduit 19.

It has been the practice heretofore to connect a hose to the outlet of the pump and when the hose was not extended outwardly in use, to manually loop the hose over and around a hook or bar, or to wind the hose around the outer circumference of a rotary reel, or sometimes to carelessly drop the hose on the ground to one side. The problem of properly caring for the hose when not extended in use has been unsatisfactorily met prior to this invention. The difficulty and inconvenience of attempting to loop the hose over and around a hook or bar has been well known. The use of a rotating reel has had several objectionable features and has been unsatisfactory in service. The necessity of a swivel or movable connection for the hose to the outlet conduit, and the construction and operation of rotating parts, have been the source of difficulties and troubles with rotating reels. Failure to properly accommodate the hose when retracted from use results in damage to the hose and inconvenience in using the grease dispensing system. Our device accommodates the hose in such a way that it is always ready for extension in use and is properly looped and housed when inserted in the container.

The confining member or hose container, denoted generally by the reference character 22, is mounted within the compartment 15 and secured thereto so as to be raised and lowered with the compartment 15. A coupling member 25 is secured by welding or other means to the hose container 22 and extends through the back wall thereof. The flexible hose 24 has one end connected to the coupling member 25 and is therefore in communication with the outlet conduit 19. While it is preferable to have one end secured just within the hose container 22 as shown, it may be connected outside of the container 22 and extend inwardly. However, even so connected the position of the inner end of the hose is relatively fixed and may be said to be anchored within the container 22.

It is to be understood that the confining member or hose container 22 while shown as having solid walls may be made of mesh, bars, or grillwork shaped to confine and contain the hose 24, and may be referred to in the specification and claims as a housing.

The outer end of the hose 24 extends through the opening 23 in the front wall 28 of the container 22. The opening 23 in the front wall 28 is positioned substantially centrally between the top and bottom thereof so that there are open spaces within the container 22 above and below the opening 23 of substantially equal size. Four rollers 34 are mounted to the front wall 28 at the opening 23 in such a way that one or more of the rollers 34 provide a roller bearing for the hose 24 through the opening 23, thus preventing scraping of the hose on the edge of the opening and thereby facilitating the extension and retraction of the hose.

The valve assembly 26 attached to the outer end of the hose 24 is the usual mechanism for applying grease from the hose to parts to be lubricated.

There are two side walls 32 disposed substantially parallel to each other to form the sides of the hose container. The adjacent walls of the compartment 15 may be utilized to serve as walls of hose container 22. The side walls 32 are relatively close together and are joined at their edges by a front wall 28, rear wall 29, top wall 31, and bottom wall 30 to form the container 22, see Figures 5 to 9 which represent cross-sectional views of the hose container 22. The relative proportions of the length of the edge wall means 30 and 31 and the length of the edge wall means 28 and 29 are substantially the same as that illustrated in Figures 1, and 5 to 9, inclusive.

The construction and operation of the device shown in Figure 1 is better illustrated in Figures 5 to 9, inclusive, which show a lengthwise sectional view of the container 22 with one of the side walls 32 removed. The remaining side wall 32 is shown as bounded by the front wall 28, the rear wall 29, the top wall 31, and bottom wall 30, which collectively form edge means for the side walls 32.

The nozzle member 25 is secured to the rear wall 29 opposite from the opening 23, and extending through the rear wall 29 is connected in communication with the outlet conduit 19. In the arrangement of the hose 24 illustrated in Figures 5 to 9, inclusive, it is preferable to place the coupling member 25 slightly above the level of the opening 23 and to have the coupling member 25 crooked so that its outlet is directed downwardly. The hose 24 connected to the nozzle member 25 so positioned causes the hose to first loop downwardly when pushed in the container 22.

Figure 5:
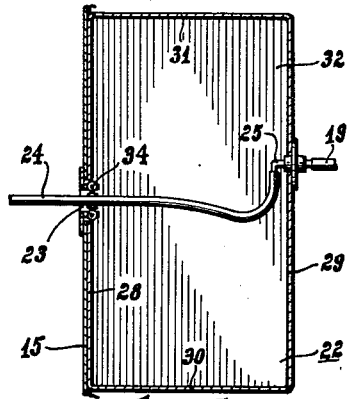
Figure 5 is a lengthwise sectional view taken through the hose container of our device shown in Figure 1 with one side removed, and illustrates a first position of the grease hose.

Starting with the arrangement shown in Figure 5, the hose 24 has been extended outwardly of the container 22, as is done when the hose is being used for dispensing grease. The hose 24 is stretched almost straight across the container 22 to the opening 23 except for the slight crook at its inner end caused by the disposition of the nozzle member 25 to which it is connected. The hose shown in Figure 5 is referred to as being in the extended position. Movement of the hose through the opening into the container 22 is referred to as the movement in retraction and the hose looped within the container 22 is referred to as being in retracted position. The several movements of the hose in going from extended position to retracted position are illustrated in Figures 5 to 9, inclusive, which show positions of the hose at successive intervals through its course of movement from the extended position to the retracted position.

Figure 6:
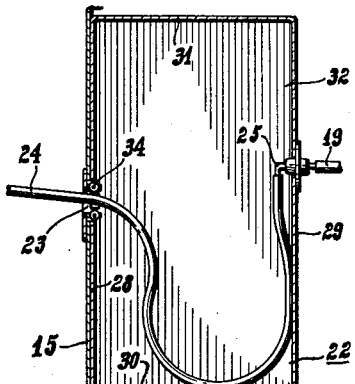
Figure 6 is a view similar to that of Figure 5 and illustrates a successive position of the grease hose.

As the hose 24 is pushed inwardly of the container 22 by pushing it from outside in front of the opening 23, the hose 24 loops downwardly into the bottom space in the container 22 and is constrained by the container 22 to form the loop shown in Figure 6. The bend of the loop approaches the front wall 28 but as retraction continues, the hose tends to bend away from the forward wall 28. The fullness of the loops and its approach to the forward wall 28 depends to an extent upon the degree of flexibility of the hose and upon the pressure of the grease within the hose. It is to be noted in Figure 6 that as soon as the downwardly extending loop is formed, there is manifested in the hose the beginning of another loop near the opening 23 and bent reversely to the bend of the first formed loop.

Figure 7:
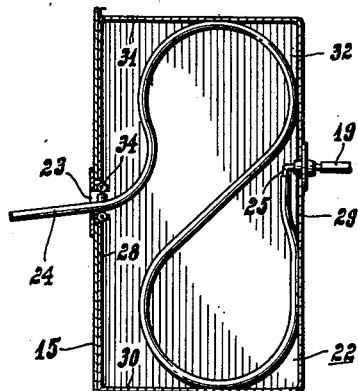
Figure 7 is a view similar to that of Figure 6 and illustrates another successive position of the grease hose.

Further inward retraction of the hose 24, by pushing it from outside, causes a second loop to develop which bends upwardly into the upper space above the opening 23 within the container 22 and is constrained by the container 22 to form said second loop, as is illustrated in Figure 7. This second loop is bent to curve reversely to the curve of the first loop developed in the movement illustrated in Figure 6. It is to be noted that the beginning of a third loop is manifested in the second loop near the opening 23.

Figure 8:
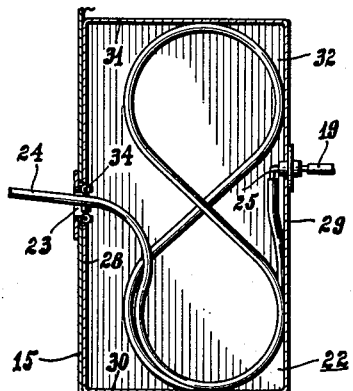
Figure 8 is a view similar to that of Figure 7 and illustrates another successive position of the grease hose.

The development of the third loop by further inward pushing of the hose 24 is illustrated in Figure 8. This third loop is curved reversely to the curve of the second loop described and moves down into the lower space in the container where it is constrained by the container 22, and is disposed beside the first loop formed. As the container 22 is constructed wide enough to accommodate several loops of hose side by side there is no difficulty in the third loop slipping past the previously disposed hose into position beside the first loop.

Figure 9:
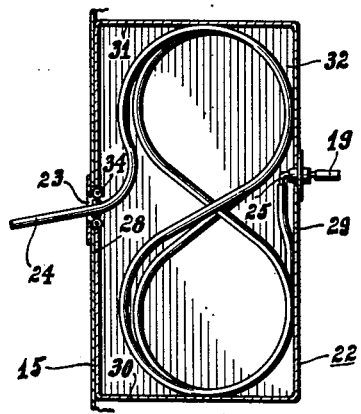
Figure 9 is a view similar to that of Figure 8 and illustrates another successive position of the grease hose.

A fourth loop is developed in the upper space in the container 22 above the opening 23 where it is constrained by the container 22 and is disposed alongside of the previously described second loop. The said fourth loop as illustrated in Figure 9 is curved reversely to the curve of the described third loop. It is seen from the several views that the hose is constrained by the container 22 and its relationship to the opening 23 to form the described alternate loops. Each pair of alternate loops is disposed substantially in the shape of a figure 8. Other similar additional loops may be alternately formed in the lower and upper spaces in the container, the number of loops to be formed depending upon the length of hose it is desired to retract and depending upon the size of the container 22 in relationship to the length of hose to be retracted. A less number of loops may likewise be formed depending upon the amount of hose to be retracted. The hose is extended by pulling the hose outwardly to deform the loops in alternate manner, the last formed loops being the first to be deformed in extension of the hose.

Figure 10:
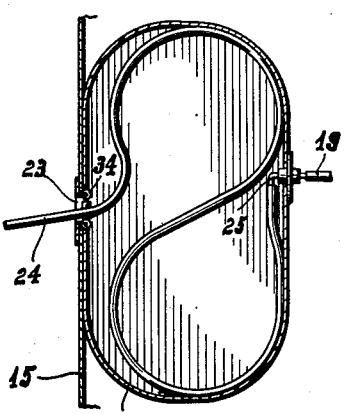
Figure 10 shows a modified form of our device and illustrates the same position of the grease hose as shown in Figure 7.

Figure 10 illustrates a modified form of a container, denoted generally by the reference character 35, which differs from the container 22 in that its edge walls are rounded to eliminate corners. The arcuate form of the narrow edge walls more closely complements the rounded form of the loops and assists in the development of the round loops. The arcuate walls in contacting more points on the curve of the loops act to better confine and constrain the looped hose in the form of the arcuate loops formed. The development of the alternate loops is similar to that described in connection with Figures 5 to 9, inclusive, the formation of the hose in Figure 10 being the same as that shown in Figure 7.

Figure 2:
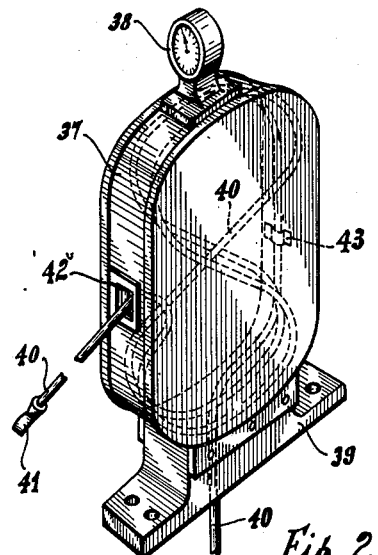
Figure 2 is a perspective view of our device used for looping an air hose connected with an air pump.

In Figure 2, our device is illustrated in connection with an air pump commonly used for inflating tires. The housing 37 is mounted on the base 39 and has the usual dial 38 in communication with the air circuit. The air hose 40 is introduced into the housing 37 through an opening thereof and is disposed around the inner arcuate walls up the side where it is anchored to the rear wall by the bracket fastening 43 at a point substantially opposite the opening 42 extending through the front wall of the housing 37. By reason of the initial disposition of the hose 40 so that it is directed upwardly, the first loop is formed in the upper space at the upper end of the housing 37, the second loop is formed alternately in the lower space, the third loop is alternately formed in the upper space, and the fourth loop is alternately formed in the lower space. The forming of the alternate loops with reverse curves is similar to that described in connection with Figures 5 to 9, inclusive. The outer end of the hose 40 extends through the opening 42 and has a valve member 41 mounted upon its outer end.

Figure 3:
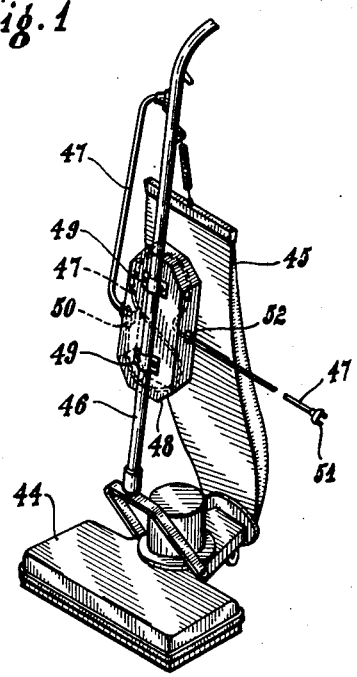
Figure 3 illustrates a form of our device used for looping an electric cord connected with an electric vacuum cleaner.

Figure 3 illustrates our device in connection with an electric cord 47 of an electric vacuum cleaner, denoted by the reference character 44. The housing 48 is mounted to the handle rod 46 by means of the brackets 49 and is positioned between the rod 46 and the dust bag 45. The cord 47 is introduced into the housing 48 at a point substantially opposite from the opening 52 and is anchored to the housing by the bracket fastening 50 so as to be directed downwardly for the first loop to be formed. The forming of alternate loops with reverse curves is similar to that described in connection with Figures 5 to 9, inclusive. The cord 47 extends out through the opening 52 and terminates with the plug-in connection 51.

Figure 4:
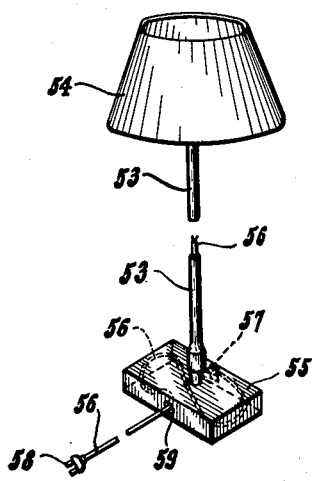
Figure 4 illustrates our device used for looping an electric cord connected with an electric lamp.

Figure 4 illustrates our device in connection with an electric cord 56 of an electric lamp having a standard 53, a shade portion 54, and a housing 55 which acts as a supporting base for the standard 53. The cord 56 is introduced into the housing 55 through the standard 53 and is anchored to an inner wall thereof by means of the bracket fastening 57 at a point substantially opposite to the opening 59. The forming of alternate loops with reverse curves is similar to that described in connection with Figures 5 to 9, inclusive. The cord 56 extends through the opening 59 and terminates with the electric plug 58. In the lamp shown in Figure 4, the housing lays upon one of its sides so that the loops are disposed on a horizontal plane rather than in a vertical plane as illustrated in the other figures.

The term "flexible" when used to modify member or conduit, shall denote such characteristics of the member or conduit as that, for example possessed by a cable, a grease or air dispensing hose, or the modern rubber covered electric cord, which allows the member or conduit to bend or loop, but possessing such resiliency or stiffness as to enable the member or conduit to maintain its looped or bent shape without kinking, in which the natural tendency of the member or conduit when bent, is to produce a gradual and substantially uniform curve.

Although we have described our invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

We claim:

1. The combination of a housing and a hose adapted to be looped within the housing, the hose possessing the tendency to extend substantially straight and being flexible to bend in a loop upon constraint, the housing having two spaced and substantially parallel side wall means and having relatively narrow connecting walls connecting said side wall means, said connecting walls having front and rear portions, the housing having an opening in the front portion of the connecting walls intermediate the ends of the housing, anchoring means for anchoring one end of the hose in the housing, the said hose passing through said opening with the other end of the hose being positioned externally of the housing, said anchoring means being disposed adjacent the rear portion of the connecting walls and spaced from a plane passing through the said opening and substantially perpendicular to the side wall means and the front and rear portions of the connecting walls, said anchoring means having a directing portion for directing the hose adjacent the anchored end substantially perpendicular to the said plane, the connecting walls at a distance from the opening and at opposite ends of the housing forming constraining surface means, the said hose upon being moved inwardly of the housing through the opening bending in a loop toward and meeting the constraining surface means at one of said opposite ends and upon being constrained thereby bending in a reverse loop toward and meeting the constraining surface means at the other of said opposite ends to form reversely curved loops constrained within the housing, the hose upon being looped being supported laterally by the side wall means.

2. The combination of a housing and a hose adapted to be looped within the housing, the hose possessing the tendency to extend substantially straight and being flexible to bend in a loop upon constraint, the housing having two spaced and substantially parallel side wall means and having relatively narrow connecting walls connecting said side wall means, the housing having an opening in one of the connecting walls intermediate the ends of the housing, anchoring means for anchoring one end of the hose in the housing, the said hose passing through said opening with the other end of the hose being positioned externally of the housing, said anchoring means being disposed at a distance from the opening and spaced from a plane passing through the said opening and substantially perpendicular to the side wall means and the connecting walls, said anchoring means having a directing portion for directing the hose adjacent the anchored end substantially perpendicular to the said plane, the connecting walls at a distance from the opening and at opposite ends of the housing forming constraining surface means, the said hose upon being moved inwardly of the housing through the opening bending in a loop toward and meeting the constraining surface means at one of said opposite ends and upon being constrained thereby bending in a reverse loop toward and meeting the constraining surface means at the other of said opposite ends to form reversely curved loops constrained within the housing, the hose upon being looped being supported laterally by the side wall means.

3. The combination of a housing and a hose adapted to be looped within the housing, the hose possessing the tendency to extend substantially straight and being flexible to bend in a loop upon constraint, the housing having two spaced and substantially parallel side wall means and having relatively narrow connecting walls connecting said side wall means, said connecting walls having front and rear portions, the housing having an opening in the front portion of the connecting walls intermediate the ends of the housing, a connecting member extending through the rear portion of the connecting walls, said connecting member having an outlet portion providing communication through said rear portion and having a nozzle portion adapted to anchor, and to communicate with, one end of said hose, said nozzle portion being disposed at an angle to said outlet portion to direct the hose adjacent said one end of the hose away from a plane perpendicular to said side wall means and passing through said opening and said connecting member, the said hose passing through said opening with the other end of the hose being positioned externally of the housing, the connecting walls at a distance from the opening and at opposite ends of the housing forming constraining surface means, the said hose upon being moved inwardly of the housing through the opening bending in a loop toward and meeting the constraining surface means at one of said opposite ends and upon being constrained thereby bending in a reverse loop toward and meeting the constraining surface means at the other of said opposite ends to form reversely curved loops constrained within the housing, the hose upon being looped being supported laterally by the side wall means.

PAUL I. SCHULTZ.
JAMES J. PELOUCH.